United States Patent
Nam et al.

(10) Patent No.: US 8,697,276 B2
(45) Date of Patent: *Apr. 15, 2014

(54) SECONDARY BATTERY WITH ENHANCED ABILITY TO PREVENT LEAKAGE

(75) Inventors: Jung-Il Nam, Yongin-si (KR); Young-Hoon Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 526 days.

This patent is subject to a terminal disclaimer.

(21) Appl. No.: 12/962,235

(22) Filed: Dec. 7, 2010

(65) Prior Publication Data

US 2011/0076554 A1 Mar. 31, 2011

Related U.S. Application Data

(63) Continuation of application No. 10/374,980, filed on Mar. 3, 2003, now Pat. No. 7,871,725.

(30) Foreign Application Priority Data

| Apr. 15, 2002 | (KR) | 2002-20402 |
| Oct. 15, 2002 | (KR) | 2002-62901 |

(51) Int. Cl.
  *H01M 2/02* (2006.01)
(52) U.S. Cl.
  USPC .......................................... 429/181; 429/180
(58) Field of Classification Search
  None
  See application file for complete search history.

(56) References Cited

U.S. PATENT DOCUMENTS

| 2,565,313 A | 8/1951 | Lauck |
| 3,909,292 A * | 9/1975 | Sekido et al. .................. 320/112 |

(Continued)

FOREIGN PATENT DOCUMENTS

| CN | 2197747 | 5/1995 |
| JP | 58-60862 | 4/1983 |

(Continued)

OTHER PUBLICATIONS

Official English Translation of WO 02/01658 in Office Communication (Part of Paper No. 20090324) issued on Mar. 27, 2009.

(Continued)

*Primary Examiner* — Ula C Ruddock
*Assistant Examiner* — Lisa S Park Gehrke
(74) *Attorney, Agent, or Firm* — Robert E. Bushnell, Esq.

(57) ABSTRACT

A secondary battery includes a can having an interior space, an electrode assembly provided in the interior space of the can, and a cap assembly seated on an opening formed in the can to seal the can and electrically connected to the electrode assembly. The cap assembly includes a cap plate connected to the opening to seal the can; a tab plate mounted to one side of the cap plate and connected to the electrode assembly; an insulating plate interposed between the cap plate and the tab plate; an electrode pin passing through the cap plate, the tab plate, and the insulating plate to interconnect these elements; and an insulating gasket interposed between the cap plate and the electrode pin. Also, the electrode pin includes a head portion mounted to one side of the cap plate and formed in multiple stages in an area contacting the insulating gasket; and a column extending from the head portion and passing through the insulating gasket, the cap plate, the insulating plate, and the cap plate.

16 Claims, 6 Drawing Sheets

(56) References Cited

U.S. PATENT DOCUMENTS

| | | | |
|---|---|---|---|
| 6,132,900 A * | 10/2000 | Yoshizawa et al. | 429/185 |
| 6,143,442 A * | 11/2000 | Takahashi et al. | 429/179 |
| 6,835,494 B2 | 12/2004 | Hayashi et al. | |
| 2001/0004505 A1 | 6/2001 | Kim et al. | |
| 2003/0104262 A1 | 6/2003 | Kuroki et al. | |

FOREIGN PATENT DOCUMENTS

| | | |
|---|---|---|
| JP | 60-59467 | 4/1985 |
| JP | 05-198291 | 8/1993 |
| JP | 08-329910 | 12/1996 |
| JP | 2000-113865 | 4/2000 |
| JP | 2001-196047 | 7/2001 |
| JP | 2001-202933 | 7/2001 |
| JP | 2003-045403 | 2/2003 |
| JP | 2003-115287 | 4/2003 |
| JP | 2003-151528 | 5/2003 |
| JP | 2003-272574 | 9/2003 |
| WO | 0201658 A1 | 1/2002 |

OTHER PUBLICATIONS

Letters Patent issued by the Chinese Patent Office on Oct. 13, 2010 with English Translation.

* cited by examiner

SECONDARY BATTERY WITH ENHANCED ABILITY TO PREVENT LEAKAGE

CLAIM OF PRIORITY

This application makes reference to, incorporates the same herein, and claims all benefits accruing under 35 U.S.C. §119 from applications for CAP ASSEMBLY AND SECONDARY BATTERY THEREWITH earlier filed in the Korean Industrial Property Office on 15 Apr. 2002 and there duly assigned Serial No. 2002-20402, and for SECONDARY BATTERY WITH ENHANCED PREVENTING CHARACTERISTIC FOR LIQUID LEAKAGE earlier filed in the Korean Industrial Property Office on the 15 Oct. 2002 and there duly assigned Serial No. 2002-62901. Further, this application is a Continuation of Applicant's patent application Ser. No. 10/374,980 filed in the U.S. Patent & Trademark Office on the 3 of Mar. 2003, and assigned to the assignee of the present invention, issued as U.S. Pat. No. 7,871,725 on the 18 of Jan. 2011.

BACKGROUND OF INVENTION

1. Field of the Invention

The present invention relates to a secondary battery, and more particularly, to a cap assembly for a secondary battery.

2. Description of the Related Art

A secondary battery may be recharged for repeated use. Secondary batteries may be made to small sizes and large capacities, and are cylindrical, prismatic, button-shaped, etc. depending on an external shape of a case, which holds an electrode assembly (i.e., pole plate assembly).

The prismatic battery will be used as an example to describe a structure of the conventional secondary battery. The basic structure of the conventional prismatic secondary battery includes a prismatic can; an electrode assembly formed in a jelly roll configuration by interposing separators between anode plates and cathode plates, on which an active material is deposited, the electrode assembly being provided in the can; and a cap assembly provided to an opening of the can to seal the same, the cap assembly being electrically connected to the electrode assembly.

The cap assembly includes a cap plate integrally assembled to the can to form a seal with the same; a tab welding plate for fixing an electrode tab that is connected to one of the electrode plates of the electrode assembly (e.g., one of the cathode plates); an insulating member provided as insulation between the cap plate and the tab welding plate; an electrode pin that passes through holes formed in the cap plate, the tab welding plate, and the insulating member to contact the tab welding plate for electrical connection to the same; and a gasket providing insulation between the electrode pin and the cap plate.

However, with the use of the cap plate having the structure described above by the secondary battery, in the case where the gasket experiences problems such that it undergoes deformation, electrolyte within the can easily leaks such that battery performance is reduced. This is a result of an area between the electrode pin and the gasket that is closely contacted, that is, a connecting area of a head portion and a column of the electrode pin being smooth and flat such that if the gasket is deformed, the electrolyte within the can travels along the column of the electrode pin and easily exits the can through the head portion.

Further, a bottom surface of the insulating member that sits on the tab welding plate is flat such that during assembly of the cap assembly, when calking of the electrode pin to the cap plate, the insulating member, and the tab welding plate is performed, the force used during calking is applied to all of the insulating member such that a significant reactive force is generated from the insulating member. This reactive force acts to deform the insulating member itself such that the seal formed at the bottom of the cap assembly is broken or made less effective.

Finally, in the secondary battery having the cap assembly as described above, it is necessary to provide a separate space for the placement of the electrode tab between the tab welding plate and the electrode assembly. This interferes with attempts to maximize the volume of the electrode assembly within the can, which, in turn, makes increasing battery capacity difficult.

SUMMARY OF THE INVENTION

It is one object of the present invention to provide a secondary battery that delays a leakage time in the case where leakage of electrolyte occurs to thereby prevent a reduction in the life span of the battery caused by electrolyte leakage.

It is another object of the present invention to provide a secondary battery that minimizes deformation of an insulating member during manufacture of the secondary battery (i.e., during calking of an electrode pin). As a result, a seal between a cap assembly and the remainder of the battery is improved.

It is still another object of the present invention to provide a secondary battery that reduces a space needed for a lead provided between a tab plate and an electrode assembly to allow for an increase in a volume of the electrode assembly.

In order to accomplish the above and other objects, accordingly in one embodiment, the present invention provides a secondary battery including a can having an interior space; an electrode assembly provided in the interior space of the can; and a cap assembly seated on an opening formed in the can to seal the can and electrically connected to the electrode assembly.

The cap assembly includes a cap plate connected to the opening to seal the can; a tab plate mounted to one side of the cap plate and connected to the electrode assembly; an insulating plate interposed between the cap plate and the tab plate; an electrode pin passing through the cap plate, the tab plate, and the insulating plate to interconnect these elements; and an insulating gasket interposed between the cap plate and the electrode pin.

Further, the electrode pin includes a head portion mounted to one side of the cap plate and formed in multiple stages in an area contacting the insulating gasket; and a column extending from the head portion and passing through the insulating gasket, the cap plate, the insulating plate, and the cap plate.

The multiple stages of the head portion of the electrode pin are realized such that a center area of the head portion is formed protruding from a remainder of the head portion. Preferably, the multiple stage configuration of the head portion of the electrode pin includes a first stage having a predetermined thickness, and a second stage having a thickness that is less than the thickness of the first stage.

A surface of the second stage is uneven, and the second stage is formed having a thickness that increasingly expands in a direction away from a center of the second stage.

Further, a receiving area is formed in a surface of the tab plate facing the electrode assembly, and a lead is bent and mounted in the receiving area in a state electrically connected to the electrode assembly. The receiving area is formed as a groove in the tab plate.

The insulating plate has a hole through which the electrode pin passes, and a seal enhancing member is formed in a periphery of this hole to prevent deformation of the insulating plate during calking of the electrode pin.

The seal enhancing member is realized through a hilly spot formation that protrudes from one surface of the insulating plate around a periphery of the hole of the insulating plate.

The tab plate is made of a nickel alloy.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 5:
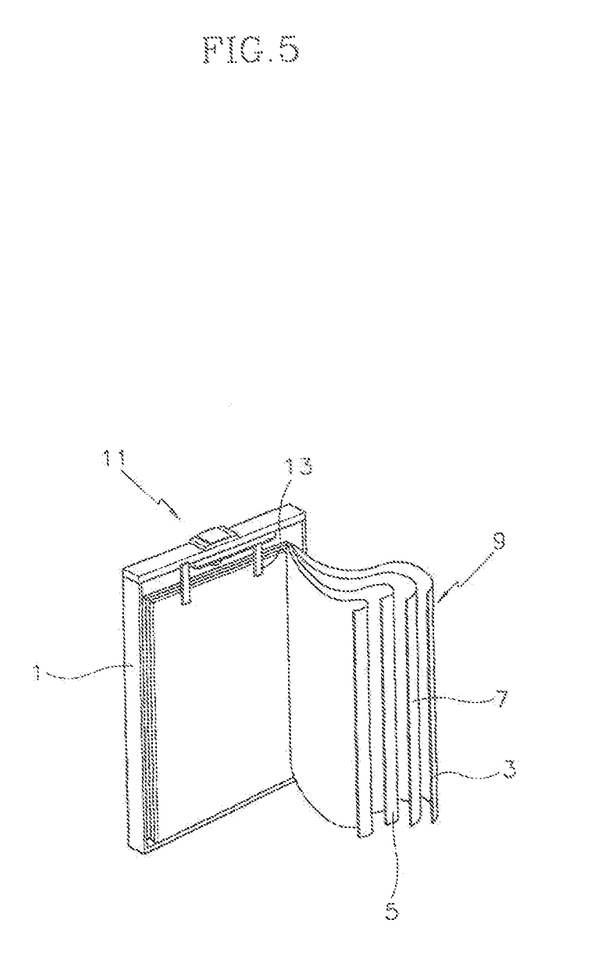
FIG. 5 is a cutaway perspective view of a conventional secondary battery.

Turning now to the drawings, the prismatic battery will be used as an example to describe a structure of the conventional secondary battery with reference to FIG. 5. The basic structure of the conventional prismatic secondary battery includes a prismatic can 1; an electrode assembly 9 formed in a jelly roll configuration by interposing separators 7 between anode plates 3 and cathode plates 5, on which an active material is deposited, the electrode assembly 9 being provided in the can 1; and a cap assembly 11 provided to an opening of the can 1 to seal the same, the cap assembly 11 being electrically connected to the electrode assembly 9.

Figure 6:
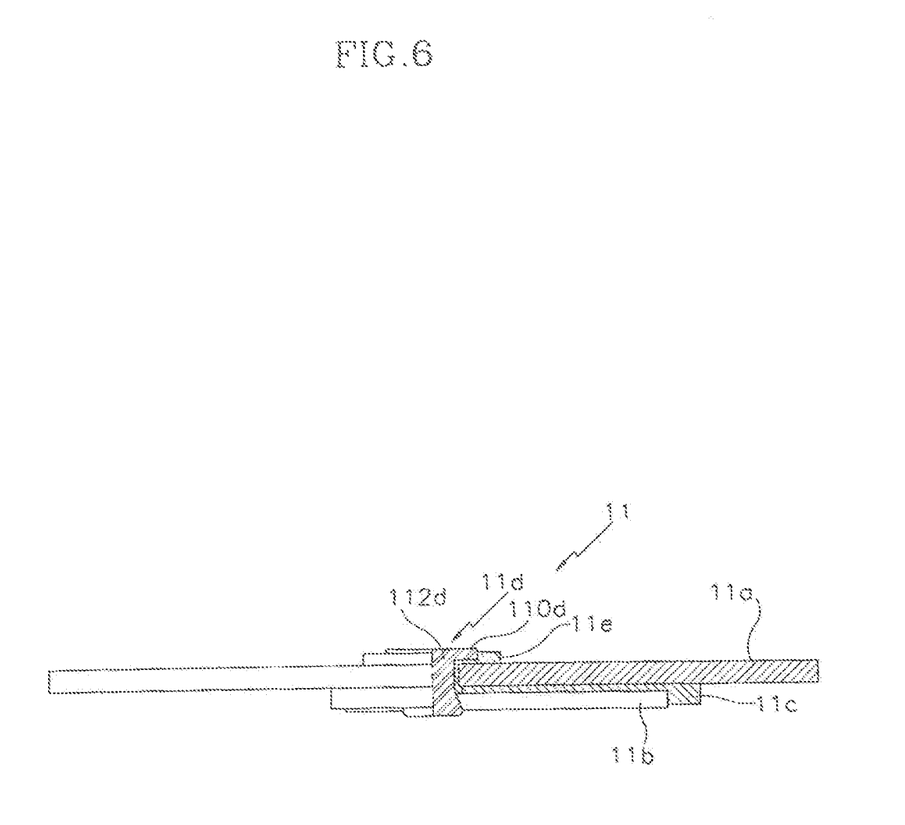
FIG. 6 is a sectional view of a cap assembly for a conventional secondary battery.

Referring also to FIG. 6, the cap assembly 11 includes a cap plate 11a integrally assembled to the can 1 to form a seal with the same; a tab welding plate 11b for fixing an electrode tab 13 that is connected to one of the electrode plates of the electrode assembly 9 (e.g., one of the cathode plates 5); an insulating member 11c provided as insulation between the cap plate 11a and the tab welding plate 11b; an electrode pin 11d that passes through holes formed in the cap plate 11a, the tab welding plate 11b, and the insulating member 11c to contact the tab welding plate 11b for electrical connection to the same; and a gasket 11e providing insulation between the electrode pin 11d and the cap plate 11a.

However, with the use of the cap plate 11 having the structure described above by the secondary battery, in the case where the gasket 11e experiences problems such that it undergoes deformation, electrolyte within the can 1 easily leaks such that battery performance is reduced. This is a result of an area between the electrode pin 11d and the gasket 11e that is closely contacted, that is, a connecting area of a head portion 110d and a column 112d of the electrode pin 11d being smooth and flat such that if the gasket 11e is deformed, the electrolyte within the can 1 travels along the column 112d of the electrode pin 11d and easily exits the can 1 through the head portion 110d.

Further, a bottom surface of the insulating member 11c that sits on the tab welding plate 11b is flat such that during assembly of the cap assembly 11, when calking of the electrode pin 11d to the cap plate 11a, the insulating member 11c, and the tab welding plate 11b is performed, the force used during calking is applied to all of the insulating member 11c such that a significant reactive force is generated from the insulating member 11c. This reactive force acts to deform the insulating member 11c itself such that the seal formed at the bottom of the cap assembly 11 is broken or made less effective.

Finally, in the secondary battery having the cap assembly 11 as described above, it is necessary to provide a separate space for the placement of the electrode tab 13 between the tab welding plate 11b and the electrode assembly 9. This interferes with attempts to maximize the volume of the electrode assembly 9 within the can 1, which, in turn, makes increasing battery capacity difficult.

Figure 1:
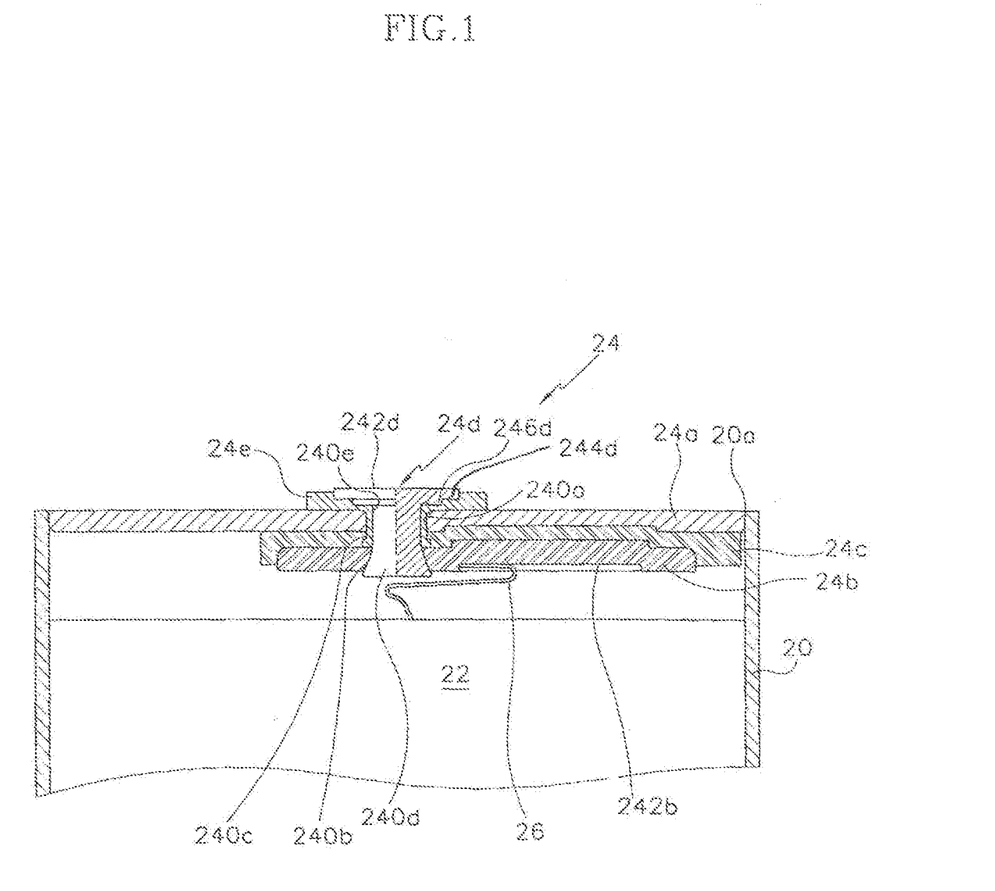
FIG. 1 is a partial sectional view of a secondary battery according to a preferred embodiment of the present invention.

FIG. 1 is a partial sectional view of a secondary battery according to an embodiment of the present invention. As an example, the secondary battery used for description is a lithium ion secondary battery that has a rectangular exterior.

The secondary battery includes an electrode assembly 22 provided within a rectangular can 20 and formed of anode plates, cathode plates, and separators. Also, a cap assembly 24 is connected to an opening 20a of the can 20. The can 20 defines an exterior of the secondary battery. In addition to the electrode assembly 22, there is provided electrolyte within the can 20. The anode plates and cathode plates of the electrode assembly 22 are wound together with separators interposed therebetween to realize a jelly roll configuration.

Further, the cap assembly 24 is seated in the opening 20a of the can 20 and is fixed thereto by welding or other means to seal the inner space within the can 20. The cap assembly 24 is electrically connected to the electrode assembly 22. Describing the cap assembly 24 in more detail, a cap plate 24a forms a base of the cap assembly 24 and is connected to the opening 20a of the can 20. A cylindrical hole 240a of a predetermined size is formed in substantially a center of the cap plate 24a, and an electrolyte injection hole and a safety vent (both not shown) are formed to both sides of the hole 240a.

A tab plate 24b is mounted to an inner surface of the cap plate 24a (a surface within the can 20). The tab plate 24b is electrically connected to the electrode assembly 22. An insulating plate 24c is interposed between the tab plate 24b and cap plate 24a, and insulates these elements from each other. Also, holes 240b and 240c that communicate with the hole 240a of the cap plate 24a are formed in the tab plate 24b and the insulating plate 24c, respectively. In the preferred embodiment of the present invention, a lead 26 extends from a cathode plate of the electrode assembly 22 to the tab plate 24b, and a tab (not shown) extends from an anode plate of the electrode assembly 22 to the cap plate 24a.

Figure 2:
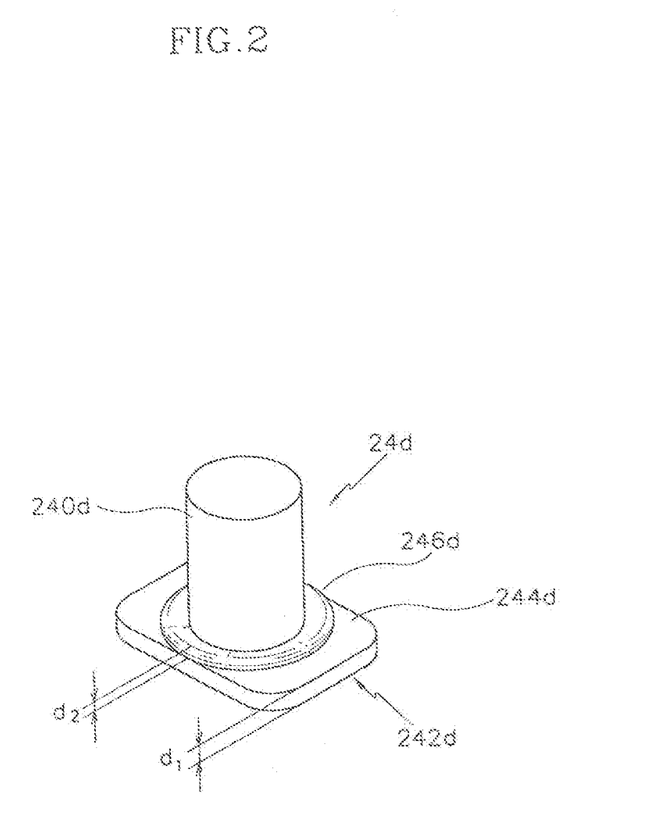
FIG. 2 is a perspective view of an electrode pin of a cap assembly according to a preferred embodiment of the present invention.

The cap plate 24a, the tab plate 24b, and the insulating plate 24c are interconnected through the electrode pin 24d that is inserted into the holes 240a, 240b, and 240c of the cap plate 24a, the tab plate 24b, and the insulating plate 24c, respectively. That is, after the electrode pin 24d is inserted into the holes 240a, 240b, and 240c, a connecting method such as calking is used to form the cap plate 24a, the tab plate 24b, and the insulating plate 24c into an integral unit with the electrode pin 24d. A head portion 242d of the electrode pin 24d is provided to a side of the cap plate 24a opposite that contacting the insulating plate 24c (i.e., to the outside of the can 20). The electrode pin 24d is shown in FIG. 1 in a state mounted to form the cap assembly 24, that is, after it has undergone calking and with a column 240d thereof deformed in a mounting state. In FIG. 2, the electrode pin 24d is shown before it is placed within into the holes 240a, 240b, and 240c such that its column 240d is not yet deformed. An insulating gasket 24e is interposed between the electrode pin 24d and the cap plate 24a. A hole 240e is also formed in the insulating gasket 24e into which the electrode pin 24d is inserted.

With respect to the formation of the head portion 242d of the electrode pin 24d, an area of the head portion 242d contacting the insulating gasket 24e (a lower end of the head portion 242d when viewing FIG. 1) is formed in a multiple stage configuration. The head portion 242d of the electrode pin 24d is formed in this manner so that in the case where electrolyte leaks from within the can 20 during operation of the secondary battery, the path through which leakage occurs is lengthened to thereby increase the time required for the leakage process (as seen for example by direction arrows in FIG. 3).

The structure of the electrode pin 24d will be described in more detail. First, the head portion 242d of the electrode pin 24d is formed in a multistage configuration as described above. That is, a center portion of the head portion 242d is formed protruding from the remainder of the head portion 242d. As shown in FIG. 2, the head portion 242d of the electrode pin 24d includes a first stage 244d, which has a predetermined thickness d1, and a second stage 246d, which is formed on a side of the first stage 244d contacting insulating gasket 24e and having a thickness d2 that is less than the thickness d1 of the first stage 244d. The second stage 246d is formed with an uneven outer surface. For example, the second stage 246d may be formed with a thickness that increasingly expands in a direction away from a center of the second stage 246d. However, the present invention is not limited to such a configuration and other shapes may be used for the second stage 246d of the head portion 242d.

Figure 3:
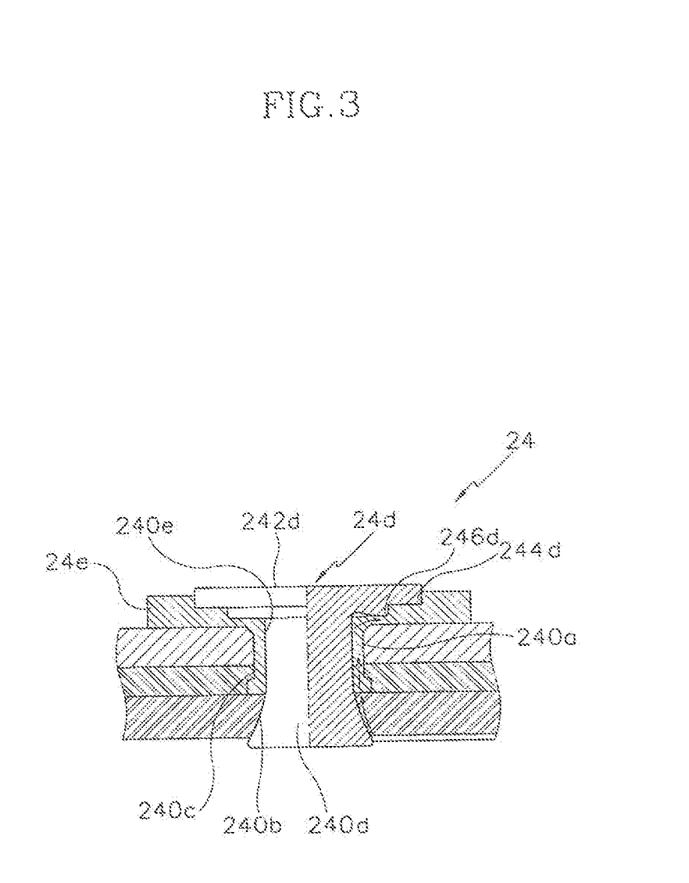
FIG. 3 is a sectional view of a cap assembly according to a preferred embodiment of the present invention.

In the secondary battery of the present invention structured as in the above, if some defects are present in the cap assembly 24, for example, if there are minute defects in the insulating gasket 24e, leakage of the electrolyte within the can 20 may result. If this occurs, the path of electrolyte leakage is increased by the uneven surface of the second stage 246d of the head portion 242d of the electrode pin 24d (as seen for example by the direction arrows in FIG. 3 showing leakage). In particular, when electrolyte that starts to leak from inside the can 20 travels along the column 240d of the electrode pin 24d and toward the head portion 242d, the speed at which the electrolyte is traveling is reduced over the earlier art as a result of having to travel over the curved form of the second stage 246d of the head portion 242d. Therefore, the time required for electrolyte to leak outside of the can 20 is increased considerably.

The head portion 242d of the electrode pin 24d that is formed in multiple stages not only delays the electrolyte leakage time, but the curved area of the head portion 242d acts to provide a better seal with the insulating gasket 24e so that leakage may be prevented.

Deformation of the insulating plate 24c occurs during calking of the electrode pin 24d. Electrolyte leakage that may be caused by this deformation is prevented by the formation of a seal-enhancing member 242c (see FIG. 4). The seal enhancing member 242c acts such that when the electrode pin 24d is connected to the above plates through a calking process, a resulting connective force is not transmitted to the parts of the insulating plate 24c (i.e., peripheries around the hole 240c of the insulating plate 24c), and instead is concentrated on the seal enhancing member 242c itself.

Figure 4:
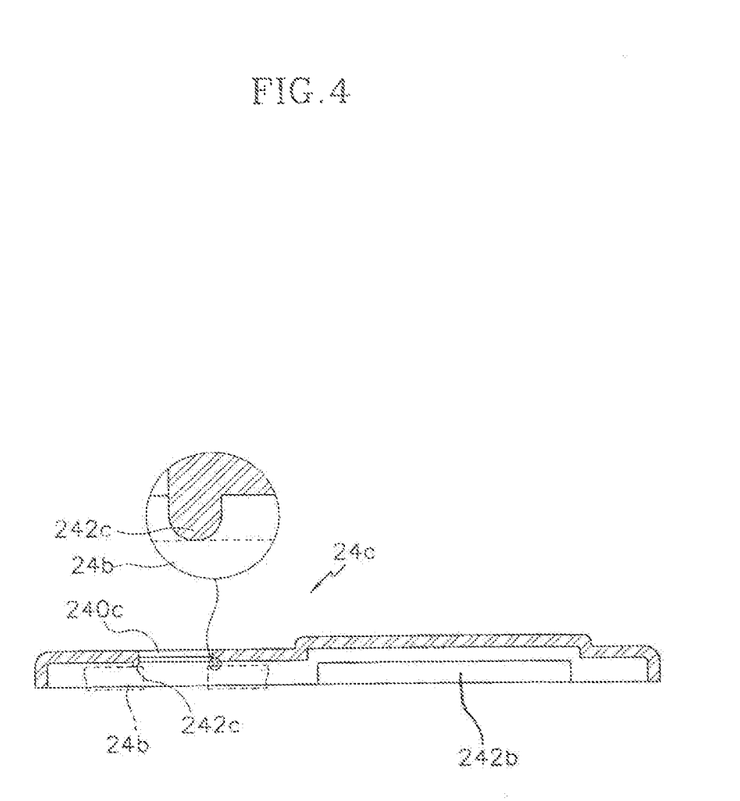
FIG. 4 is a sectional view of an insulating plate of a cap assembly according to a preferred embodiment of the present invention.

In the preferred embodiment of the present invention, the seal enhancing member 242c is realized through a hilly spot formation that protrudes from an inner surface of the insulating plate 24c around a periphery of the hole 240e of the insulating plate 24c. During manufacture of the cap assembly 24, the seal enhancing member 242c first contacts (before the inner surface of the insulating plate 24c) an upper surface of the tab plate 24b when the insulating plate 24c is assembled to the tab plate 24b. As a result, the force generated during calking of the electrode pin 24d is concentrated on the seal-enhancing member 242c.

By such operation of the seal-enhancing member 242c, the insulating plate 24c prevents deformation of other areas extending past the peripheries of the hole 240c. This ensures a state of close contact between the cap plate 24a and the tab plate 24b to further prevent the leakage of electrolyte from the cap assembly 24.

It is preferable that the tab plate 24b of the cap assembly 24 is made of a nickel alloy. Nickel alloy ensures that the tab plate 24b has a high degree of hardness such that deformation of the tab plate 24b is prevented when the electrode pin 24d is calked (during manufacture of the cap assembly 24).

Further, formed in the tab plate 24b that extends in a direction toward the electrode assembly 22 is a receiving area 242b for holding the lead 26. The receiving area 242b is a groove formed at a predetermined depth on one side of the tab plate 24b. The lead 26 is provided in a bent configuration as shown in FIG. 1, with one end being welded in the receiving area 242b.

With the lead 26 mounted in the receiving area 242b to be connected to the tab plate 24b, a separate space need not be provided as in the conventional secondary battery for the lead 26. The space needed inside the can 20 is therefore reduced. This allows the electrode assembly 22 to be enlarged by as much as the saved space such that battery capacity may be increased. In particular, it was determined that an increase of 2% in capacity (e.g., a capacity increase of 20 mAh (milli-ampere hour) for a battery of a 1000 mAh capacity) was realized with the use of the receiving area 242b rather than the extra space for the lead in the conventional battery.

In addition, a stable mounting structure is realized with the above method of fixing the lead 26 within the receiving area 242b. As a result, the possibility of the lead 26 becoming disconnected is reduced when the cap assembly 24 is mounted to the can 20. Also, the fixing of the lead 26 within the receiving area 242b (by welding as described above) is easy.

In the secondary battery of the present invention described above, the quality of the seal made between the cap assembly and can is improved to better prevent the leakage of electrolyte. Also, in the case leakage does occur, the present invention is configured such that the leakage takes place more slowly to thereby prevent a reduction in the lifespan of the battery caused by electrolyte leakage.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A secondary battery, comprising:
    a can;
    an electrode assembly in an interior space of said can; and a cap assembly sealing said can and providing an electrical connection to said electrode assembly, said cap assembly comprising:
    a cap plate connected to the can to provide the sealing of said can;
    a tab plate mounted to one side of said cap plate and connected to said electrode assembly;
    an insulating plate interposed between said cap plate and said tab plate; and
    an electrode pin passing through and interconnecting said cap plate, said tab plate, and said insulating plate, said electrode pin comprising:
        a head portion mounted upon said cap plate and formed in multiple stages in an area contacting an insulating gasket extended coextensively between said head portion and said cap plate and beyond said head portion, said multiple stages including a first stage having a predetermined thickness and a second stage having a thickness being less than the thickness of said first stage; and
        a column extending from said head portion and passing through said insulating gasket, said cap plate, said insulating plate, and said tab plate, one of two surfaces of the second stage being an uneven surface that intersects the column,
        said insulating gasket interposed between said insulating plate and said electrode pin, and extended continuously from beyond said head portion and along said column to said tab plate, to separate said electrode pin from said cap plate and from said insulating plate.

2. The secondary battery of claim 1, wherein said multiple stages of said head portion of said electrode pin is realized with a center area of said head portion being formed protruding from a remainder of said head portion.

3. The secondary battery of claim 1, wherein the second stage is formed having a thickness increasingly expanding in a direction away from a center of the second stage.

4. The secondary battery of claim 1, wherein said can is prismatic.

5. The secondary battery of claim 1, wherein a recessed area is formed in a surface of said tab plate facing said electrode assembly, and a lead is bent and mounted in the recessed area in a state electrically connected to said electrode assembly.

6. The secondary battery of claim 5, wherein the recessed area is formed as a groove in said tab plate.

7. A secondary battery, comprising:
    a can;
    an electrode assembly encased by said can; and
    a cap assembly sealing the can, said cap assembly comprising:
        a cap plate sealing said can;
        a tab plate mounted to one side of said cap plate and connected to said electrode assembly;
        an insulating plate interposed between said cap plate and said tab plate; and
        an electrode pin passing through and interconnecting said cap plate, said tab plate, and said insulating, said electrode pin comprising:
            a head portion mounted upon said cap plate and formed in multiple stages in an area contacting an insulating gasket extended coextensively between said head portion and said cap plate and beyond said head portion, said multiple stages including a first stage having a predetermined thickness and a second stage having a thickness being less than the thickness of said first stage; and
            a column extending from said head portion and passing through said insulating gasket, said cap plate, said insulating plate, and said tab plate, one of two surfaces of the second stage being an uneven surface that intersects the column,
        said insulating gasket separating said electrode pin from said cap plate and from said insulating plate by extending continuously from beyond said head portion and along said column of said electrode pin to said tab plate and maintaining said cap plate and said insulating plate spaced-apart from said electrode pin, and
        said insulating plate including a hole through which said insulating gasket and said electrode pin pass, and a seal enhancing member formed on a periphery of the hole facing the tab plate and accommodating calking of said electrode pin.

8. The secondary battery of claim 7, wherein said seal enhancing member is realized through a hilly spot formation that protrudes from one surface of said insulating plate around the periphery of the hole of said insulating plate.

9. The secondary battery of claim 7, wherein said can is prismatic.

10. The secondary battery of claim 7, wherein a recessed area is formed in a surface of said tab plate facing the electrode assembly, and a lead is bent and mounted in the recessed area in a state electrically connected to said electrode assembly.

11. The secondary battery of claim 10, wherein the recessed area is formed as a groove in said tab plate.

12. A secondary battery, comprising:
    a can;
    an electrode assembly encased by said can; and
    a cap assembly sealing the can, said cap assembly comprising:
        a cap plate sealing said can;
        a tab plate mounted to one side of said cap plate and connected to said electrode assembly;
        an insulating plate interposed between said cap plate and said tab plate, said insulating plate comprising a seal enhancing member formed to protrude from the insulating plate on a periphery of a hole facing the tab plate;
        an electrode pin passing through the periphery of the hole and interconnecting said cap plate, said tab plate, and said insulating plate, said seal enhancing member engaging said tab plate and accommodating calking of said electrode pin; and
        an insulating gasket separating said cap plate and said insulating plate from said electrode pin,
    said electrode pin comprising:
        a head portion mounted upon said cap plate and formed in multiple stages in an area contacting the insulating gasket extended coextensively between said head portion and said cap plate and beyond said head portion, said multiple stages including a first stage having a predetermined thickness and a second stage having a thickness being less than the thickness of said first stage; and
        a column extending from said head portion and passing through said insulating gasket, said cap plate, said insulating plate, and said tab plate, one of two surfaces of the second stage being an uneven surface that intersects the column.

13. The secondary battery of claim 12, wherein the can is prismatic.

14. The secondary battery of claim 12, wherein a recessed area is formed in a surface of said tab plate facing said electrode assembly, and a lead is bent and mounted in the recessed area in a state electrically connected to said electrode assembly.

15. The secondary battery of claim 14, wherein the recessed area is formed as a groove in said tab plate.

16. The secondary battery of claim 12, comprising said insulating gasket extending continuously from beyond said head portion and along said column of said electrode pin to said tab plate, to separate said electrode pin from said cap plate and from said insulating plate.

* * * * *